(12) United States Patent
Babin

(10) Patent No.: US 7,255,555 B2
(45) Date of Patent: Aug. 14, 2007

(54) SMALL PITCH MOLDING MANIFOLD

(75) Inventor: Denis Babin, Georgetown (CA)

(73) Assignee: Mold-Masters Limited, Georgetown, Ontario (CA)

(*) Notice: Subject to any disclaimer, the term of this patent is extended or adjusted under 35 U.S.C. 154(b) by 295 days.

(21) Appl. No.: 11/120,205

(22) Filed: May 3, 2005

(65) Prior Publication Data

US 2005/0244536 A1    Nov. 3, 2005

Related U.S. Application Data

(60) Provisional application No. 60/566,946, filed on May 3, 2004.

(51) Int. Cl.
  *B29C 45/22* (2006.01)
(52) U.S. Cl. ...................... 425/572; 425/588
(58) Field of Classification Search ............ 425/572, 425/588
  See application file for complete search history.

(56) References Cited

U.S. PATENT DOCUMENTS

| | | | |
|---|---|---|---|
| 2,253,460 A | 8/1941 | Hempel | |
| 2,770,011 A | 11/1956 | Kelly | |
| 2,871,517 A * | 2/1959 | Allard | 425/572 |
| 2,984,862 A * | 5/1961 | Chabotte | 425/588 |
| 3,091,812 A * | 6/1963 | Witkowski | 425/588 |
| 3,520,026 A | 7/1970 | Stidham et al. | |
| 3,537,139 A | 11/1970 | Segmuller | |
| 3,568,256 A | 3/1971 | Johnson, Jr. | |
| 3,758,252 A | 9/1973 | Kohler | |
| 3,977,820 A | 8/1976 | Beyerlein et al. | |
| 4,034,952 A | 7/1977 | Stewart | |
| 4,312,630 A | 1/1982 | Travaglini | |
| 4,648,546 A | 3/1987 | Gellert | |
| 4,689,473 A | 8/1987 | Muller | |
| 4,761,343 A | 8/1988 | Gellert | |
| 5,030,084 A | 7/1991 | Gellert et al. | |
| 5,096,411 A | 3/1992 | Gellert | |
| 5,238,393 A | 8/1993 | Kishi | |
| 5,464,343 A | 11/1995 | Hepler | |
| 5,496,168 A | 3/1996 | Renwick | |
| 5,551,863 A | 9/1996 | Hepler | |

(Continued)

FOREIGN PATENT DOCUMENTS

DE    33 38 783 C1    3/1985

(Continued)

OTHER PUBLICATIONS

"Hot Runner System suits micromolding applications", ThomasNet Industrial NewsRoom, Jan. 22, 2004.

(Continued)

*Primary Examiner*—Tim Heitbrink
(74) *Attorney, Agent, or Firm*—Ridout & Maybee LLP

(57) ABSTRACT

An injection molding apparatus for small pitch molding includes a plurality of mold cavities having a small pitch therebetween. The injection molding apparatus includes a manifold for delivering melt to a sub-manifold. The sub-manifold including at least one upstream manifold plate and a downstream nozzle plate. The upstream manifold plate and/or the nozzle plate includes a heater. At least one unheated nozzle is mounted in the downstream nozzle plate for receiving melt from the sub-manifold and delivering the melt to a mold cavity.

22 Claims, 8 Drawing Sheets

U.S. PATENT DOCUMENTS

| | | |
|---|---|---|
| 5,587,188 A | 12/1996 | Hepler |
| 5,641,526 A | 6/1997 | Gellert |
| 5,645,874 A | 7/1997 | Osuna-Diaz |
| 5,652,003 A | 7/1997 | Gellert |
| 6,033,206 A | 3/2000 | Greene et al. |
| 6,045,740 A | 4/2000 | Görlich |
| 6,390,803 B1 | 5/2002 | Christen |
| 2002/0168442 A1 | 11/2002 | Gould et al. |

FOREIGN PATENT DOCUMENTS

| | | |
|---|---|---|
| DE | 3501840 A1 | 7/1986 |
| DE | 3933281 A1 | 4/1990 |

OTHER PUBLICATIONS

"New Miniature Manifold System", Polyshot Hot Runner Systems, New Release, Nov. 2004.

Hasco Brochure, Mini Hot Runner Systems, Mar. 2005.

* cited by examiner

SMALL PITCH MOLDING MANIFOLD

This application claims the benefit of U.S. Provisional Application No. 60/566,946 filed on May 3, 2004.

FIELD OF THE INVENTION

The present invention relates generally to an injection molding apparatus and, in particular to a small pitch molding manifold communicating with an array nozzles.

BACKGROUND OF THE INVENTION

There is a need for an injection molding apparatus that provides a small pitch between nozzles in order to increase the number of molded parts that may be produced from an injection molding apparatus having a predetermined size. Due to the size restrictions the location of a nozzle heater along the melt channel of each nozzle is impractical because it increases the spacing between the nozzles.

SUMMARY OF THE INVENTION

This invention teaches an injection apparatus to produce small molded parts in a mold having a plurality of mold cavities separated by minimum spacing or pitch. The molten material received from a source enters the manifold through a manifold inlet and the melt is further distributed via a plurality of manifold melt channels to a plurality of manifold outlets communicating with a plurality of small nozzles having no individual nozzle heater.

In an embodiment of the invention, the mold cavities are not uniformly or equally spaced along certain axis and thus the nozzles and the manifold outlets are also unevenly spaced along certain axis located in a plane parallel to the manifold heater plate. In one embodiment, the nozzles deliver molten material into a plurality of mold cavities that include a common substrate onto which the small molded parts are attached. In an embodiment of the invention, the nozzles are located by and attached to a heated sub-manifold plate by a nozzle plate.

BRIEF DESCRIPTION OF THE FIGS.

Embodiments of the present invention will now be described more fully with reference to the accompanying drawings in which like reference numerals indicate similar structure.

DETAILED DESCRIPTION OF THE INVENTION

Figure 1:
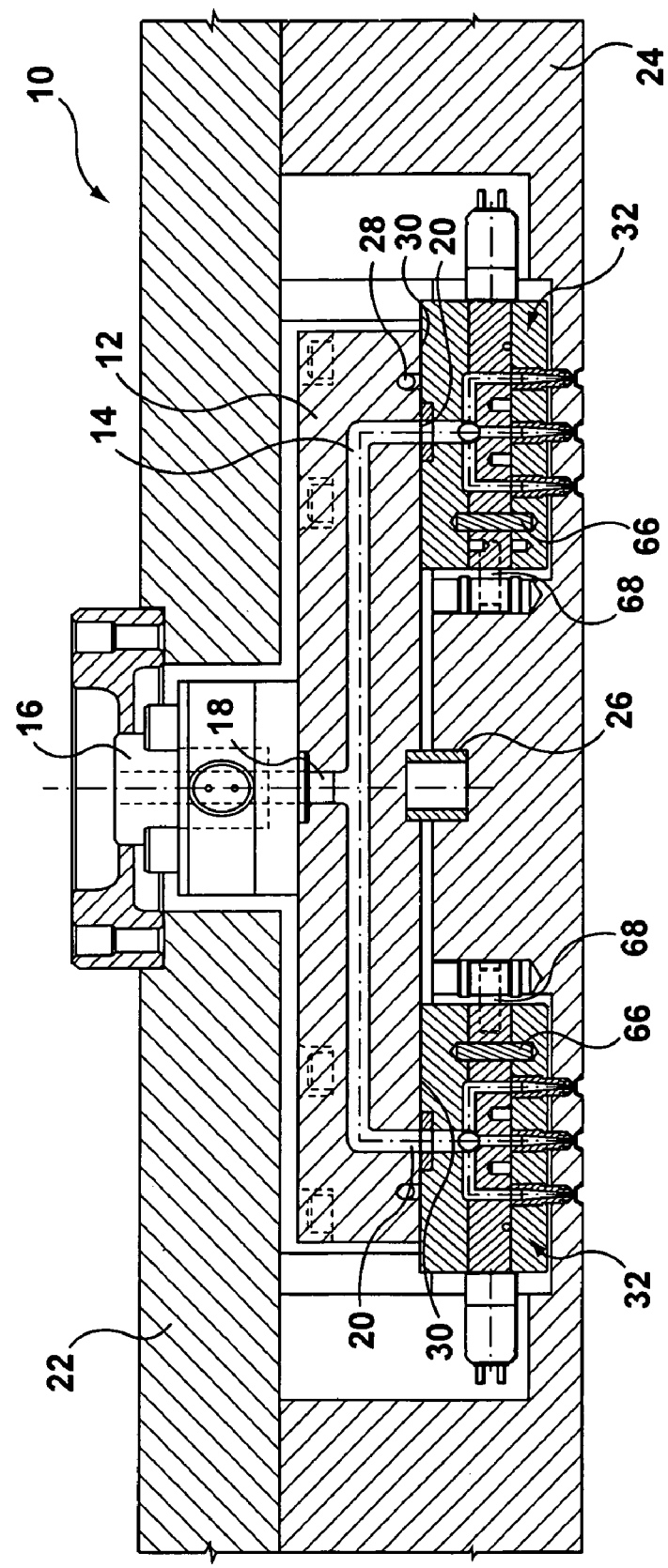
FIG. 1 is a side sectional view of an injection molding apparatus according to an embodiment of the present invention.

Referring now to FIG. 1, an injection molding apparatus is generally shown at 10. The injection molding apparatus 10 includes a main manifold 12, which is spaced between a back plate 22 and a cavity mold plate 24. The manifold 12 is located relative to the cavity mold plate 24 by a locating ring 26. A sprue bushing 16 is coupled to an inlet 18 of the manifold 12. The sprue bushing 16 receives melt from a machine nozzle (not shown) and delivers the melt through inlet 18 to a manifold channel 14 of the manifold 12.

The melt flows through the manifold channel 14 and exits the manifold 12 through manifold outlets 20. The manifold 12 is heated by a manifold heater 28.

Figure 2:
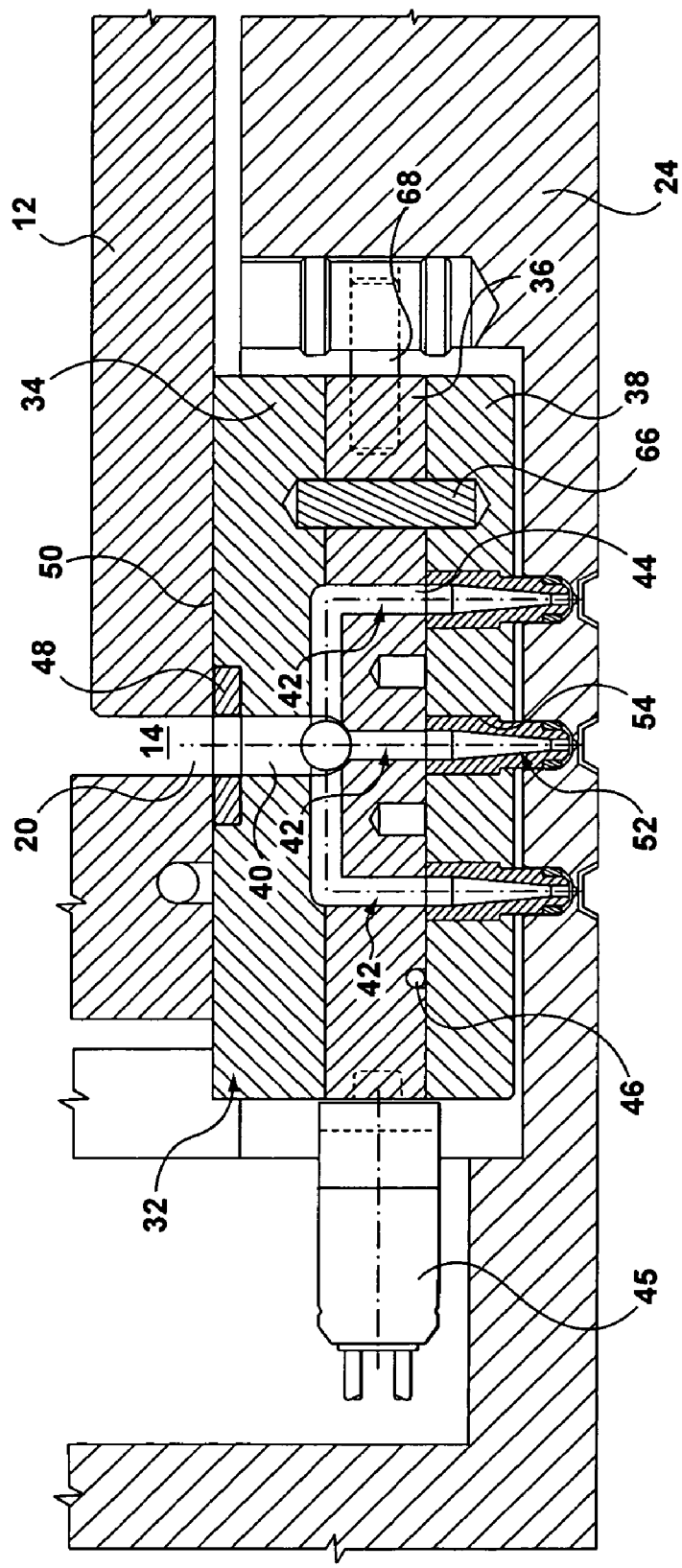
FIG. 2 is an enlarged view of a portion of FIG. 1.

Sub-manifolds 32 are coupled to a downstream surface 30 of the manifold 12 to receive melt from each of the manifold outlets 20. As shown in FIG. 2, each sub-manifold 32 may include a first sub-manifold plate 34, a second sub-manifold plate 36 and a nozzle plate 38. The sub-manifold plates 34 and 36, and nozzle plate 38 may be secured to one another by brazing, or any other suitable method. In an embodiment, each of the plates 34, 36, 38 is constructed of the same material, such as H13 steel or any other suitable material. In another embodiment, nozzle plate 38 may be made of a more highly thermally conductive material than either of sub-manifold plates 34 or 36.

A sub-manifold inlet channel 40 extends through the first sub-manifold plate 34 to provide a link between the manifold outlet 20 of the manifold 12 and sub-manifold channels 42, which extend through the second sub-manifold plate 36. A manifold seal 48 is nested in an upstream surface 50 of the sub-manifold 32 to generally prevent melt leakage between the manifold outlet 20 and the sub-manifold inlet channel 40. The sub-manifold channels 42 receive the melt stream from the manifold outlet 20 and deliver the melt stream to sub-manifold channel outlets 44.

An alignment dowel 66 is provided to align the sub-manifold plates 34, 36, and nozzle plate 38 with one another. A locating dowel 68 locates the sub-manifold 32 with respect to the cavity mold plate 24. There may be additional locating dowels 68 spaced about the sub-manifold 32 to generally prevent rotation of the sub-manifold 32 relative to the cavity mold plate 24.

Figure 3:
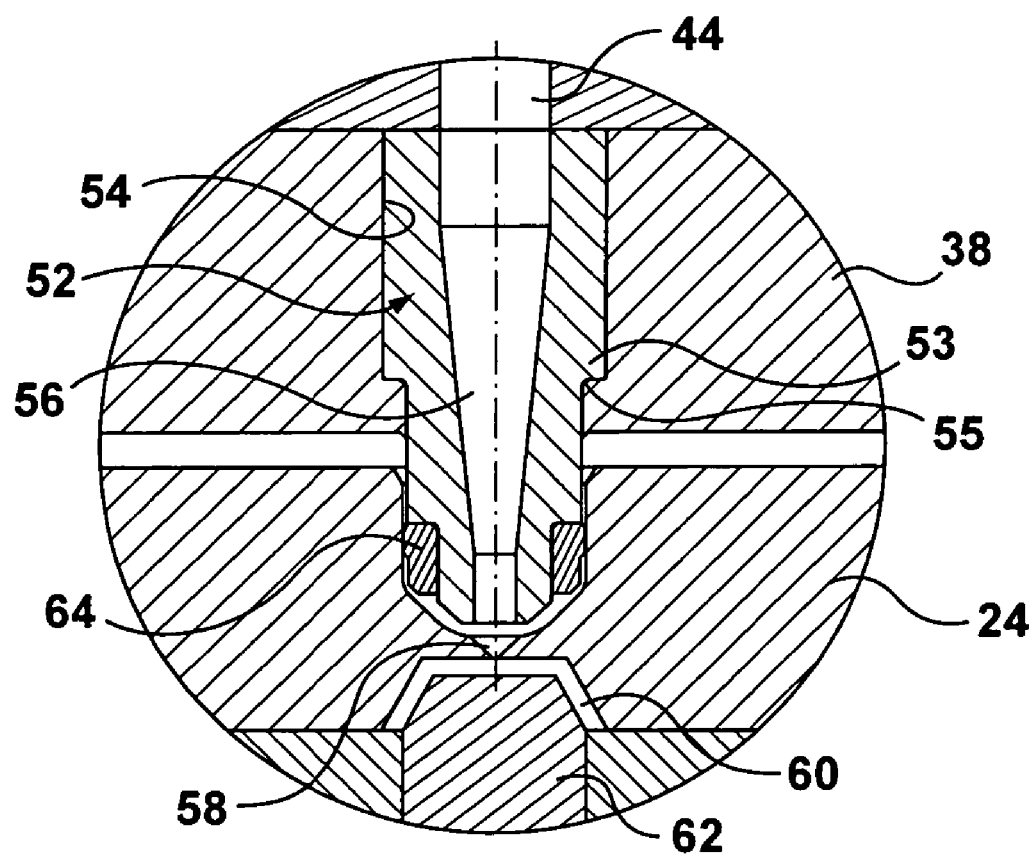
FIG. 3 is a further enlarged view of a portion of FIG. 2.

A plurality of unheated nozzles 52 extend from the nozzle plate 38. Each nozzle 52 is received in a bore 54 that is provided in the nozzle plate 38. Referring also to FIG. 3, the nozzles 52 are inserted into nozzle plate 38 from the upstream side of nozzle plate 38. Each nozzle 52 includes a shoulder 53 that abuts a step 55 of bore 54. In an embodiment, the nozzles 52 are coupled to the nozzle plate 38 by brazing. In another embodiment, the nozzles 52 may be coupled to the nozzle plate 38 by a mounting plate that is bolted to a downstream side thereof. In another embodiment, the nozzles 52 may be coupled to the second sub-manifold plate 36 by brazing, welding or any other coupling method known in the art and nozzle plate 38 may be installed thereafter. The nozzles 52 may be constructed of a highly thermally conductive material.

Each nozzle 52 includes a nozzle melt channel 56 for receiving melt from one of the sub-manifold channel outlets 44. Each nozzle melt channel 56 delivers melt to a respective mold cavity 60 through a mold gate 58. The mold cavities 60 are located between the cavity mold plate 24 and a mold core 62. In the embodiment shown in FIGS. 1-3, mold gates 58 are thermal gated. Thermal gating is well known in the art and therefore will not be discussed further here.

A seal 64 surrounds each of the nozzles 52 adjacent downstream ends thereof. The seals 64 are provided to generally prevent the backflow of melt into the space between the cavity mold plate 24 and the sub-manifold 32. The seals 64 are comprised of a material that is more insulative than the nozzles 52 in order to reduce heat loss from the nozzles 52 to the cold mold cavity plate 24. Suitable materials include titanium and ceramic, for example.

Second sub-manifold plate 36 includes a heater 46, which is coupled to a power source (not shown) through an electrical connector 45. The heater 46 is generally a heating element that is embedded in a downstream surface of the second manifold plate 36. In an embodiment of the present invention, heating element 46 is arranged in a pattern that allows for generally even heat distribution to nozzle plate 38 and subsequently to each of the nozzles 52 coupled thereto, while avoiding crossing the sub-manifold channel outlets 44. Any heater known in the art may be used to heat second sub-manifold plate 36. For example, cartridge or strip heaters may be used. It shall also be appreciated that one or more thermocouples (not shown) may be included within or on first sub-manifold plate 34 or second manifold plate 36 to monitor the temperature of the sub-manifold.

Figure 7:
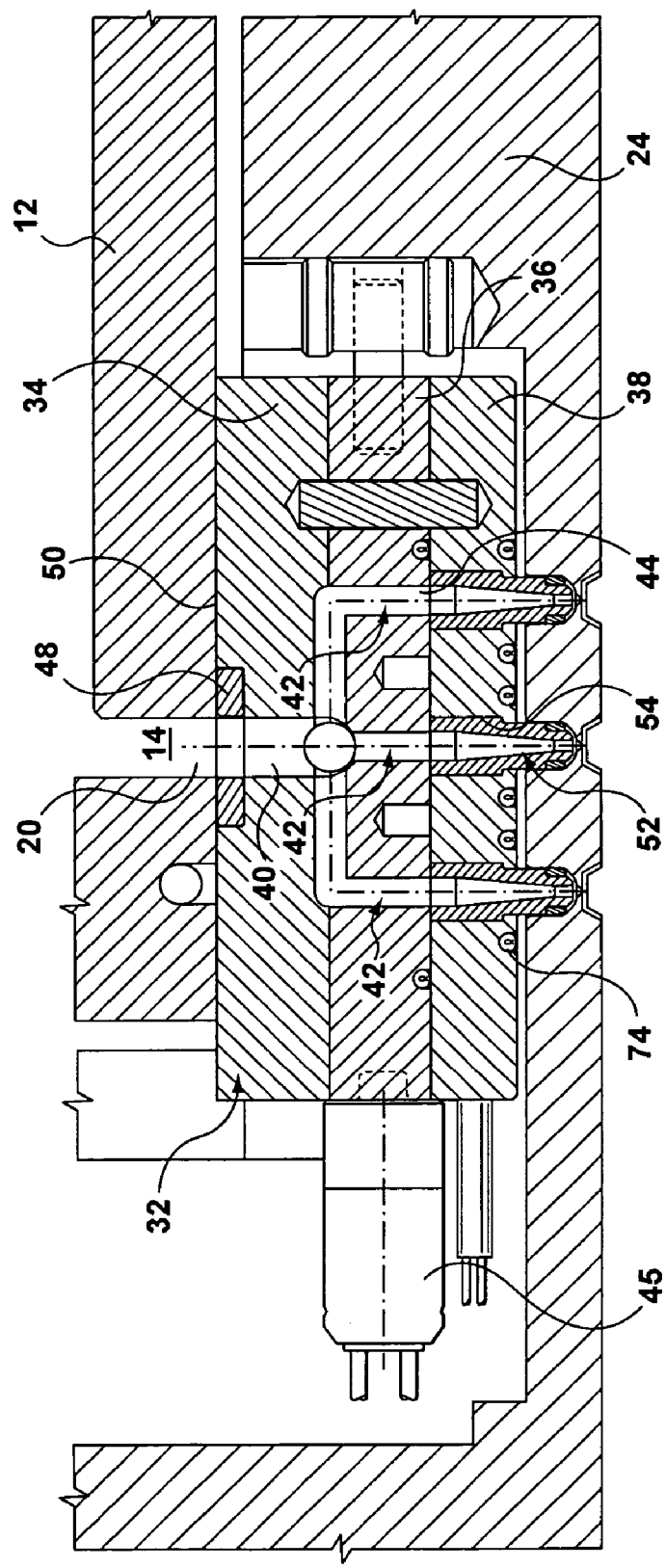
FIG. 7 is a side sectional view of a portion of an injection molding apparatus according to another embodiment of the invention.

In an embodiment, nozzle plate 38 is heated by a heating element 74 similar to the embedded heating element 46 of second sub-manifold plate 36 (described above), as shown in FIG. 7. Heating element 74 may be used to increase the heat transferred to nozzles 52.

Figure 8:
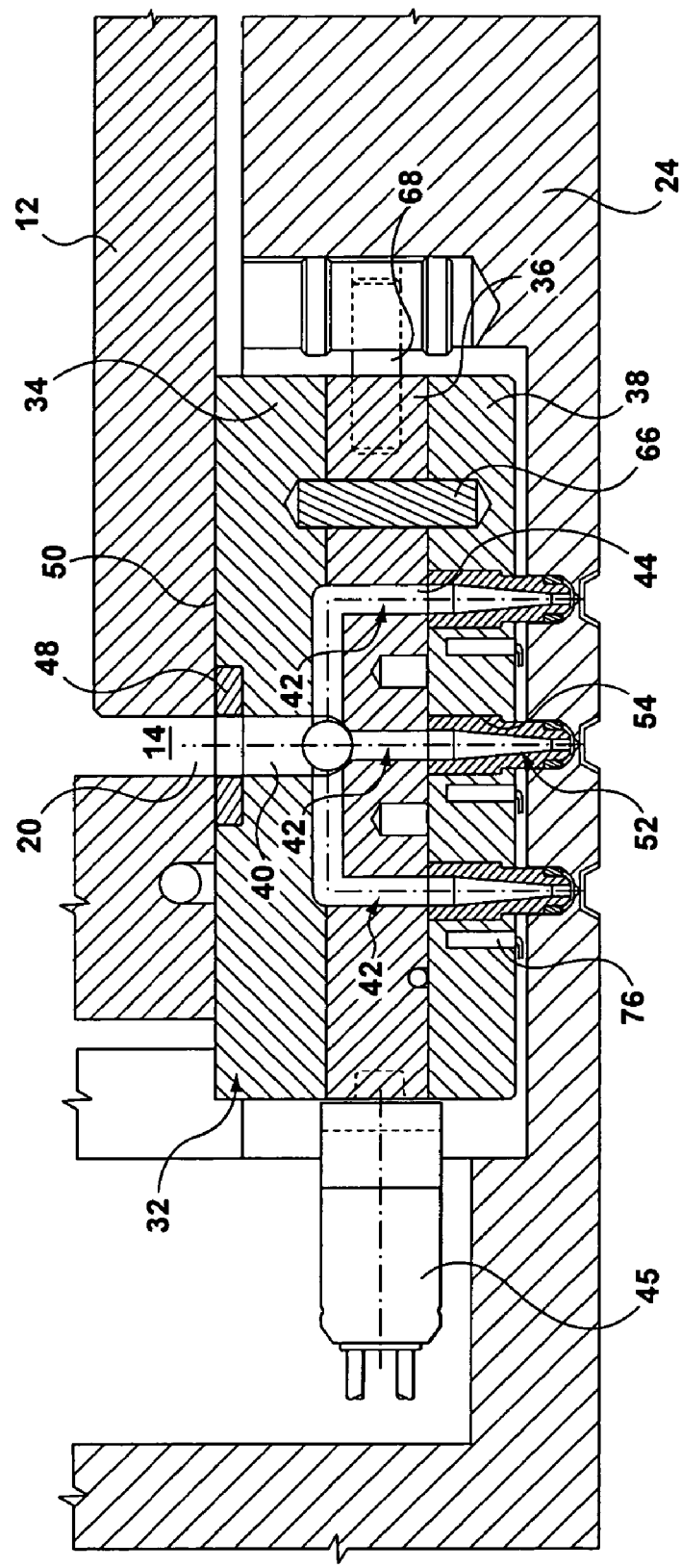
FIG. 8 is a side sectional view of a portion of an injection molding apparatus according to yet another embodiment of the invention.

FIG. 8 shows an embodiment that includes cartridge heaters 76 in nozzle plate 38 and proximate to nozzles 52 to increase the heat transferred to the melt in the melt channels thereof. It shall be appreciated that the respective heaters in the manifold plate and the nozzle plate may be operated at different temperatures. It shall also be appreciated that one or more thermocouples (not shown) may be included within or on nozzle plate 38.

In operation, the machine nozzle injects melt through the sprue bushing 16 into the manifold channel 14 of the manifold 12. The manifold channel 14 distributes the melt to a plurality of sub-manifolds 32. The sub-manifold channels 42 of each sub-manifold 32 further distribute the melt to the nozzle melt channels 56 of nozzles 52. The nozzle melt channels 56 deliver the melt to the mold cavities 60 through mold gates 58. Following injection, the melt in the mold cavities 60 is cooled and the molded parts are then ejected from the injection molding apparatus 10.

In another embodiment, the first sub-manifold plate 34 and the second sub-manifold plate 36 are combined into a single plate. In this arrangement, the sub-manifold includes an upstream sub-manifold plate, which is a combination of the first sub-manifold plate and the second sub-manifold plate, and a downstream sub-manifold plate, which is generally the nozzle plate.

Figure 4:
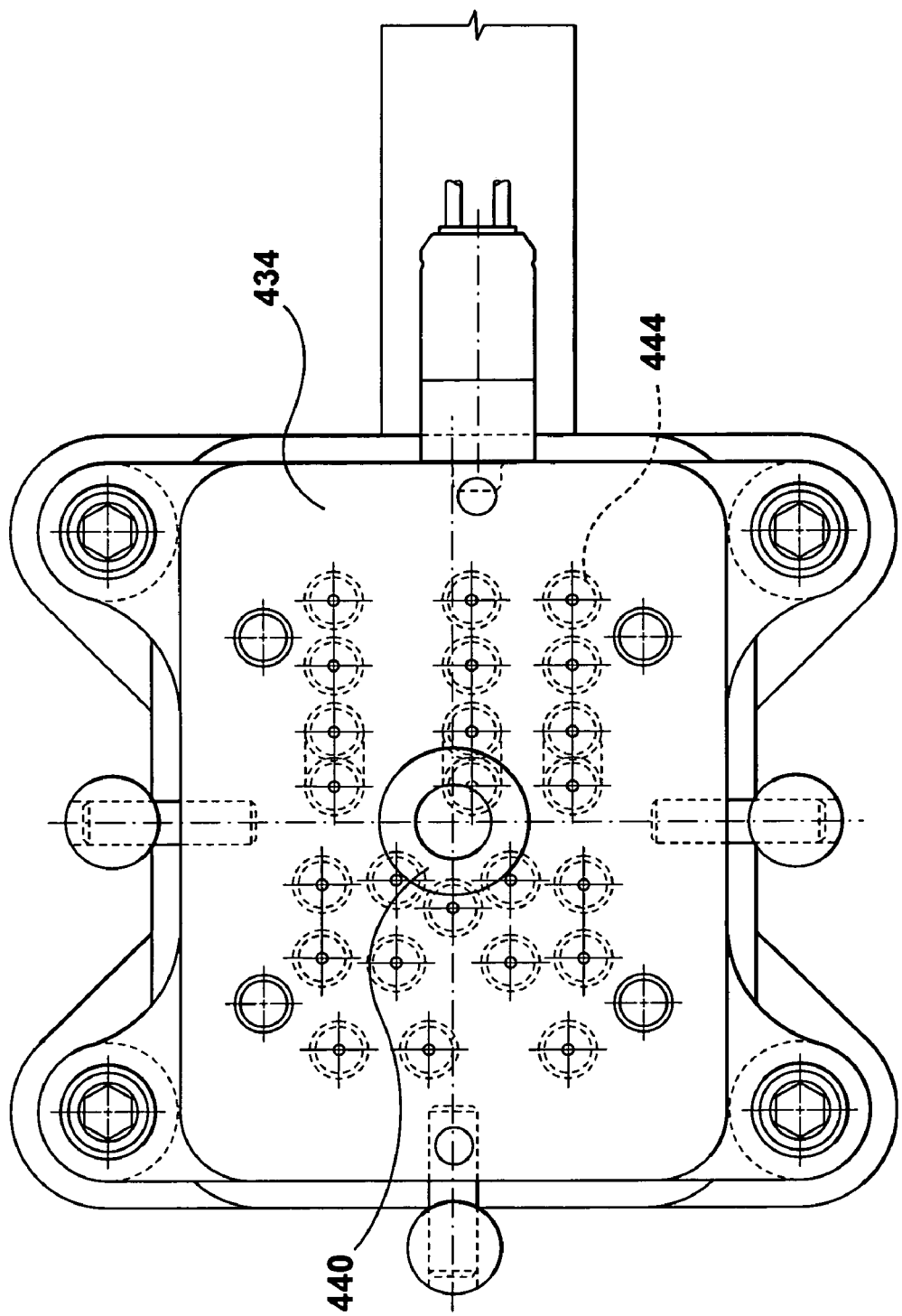
FIG. 4 is a top planar view of a first sub-manifold plate according to an embodiment of the present invention.
Figure 5:
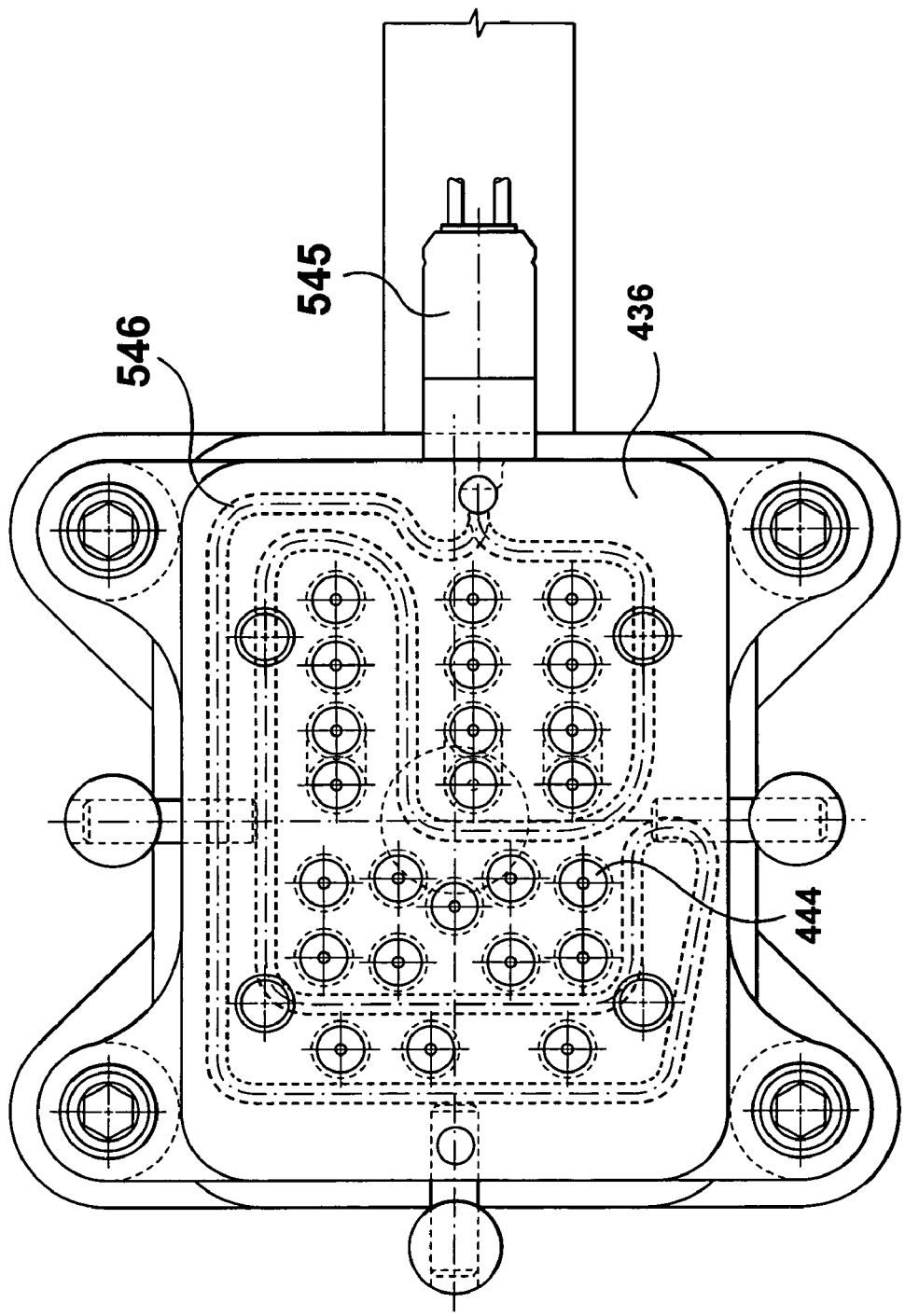
FIG. 5 is a top planar view of a second sub-manifold plate according to an embodiment of the present invention.
Figure 6:
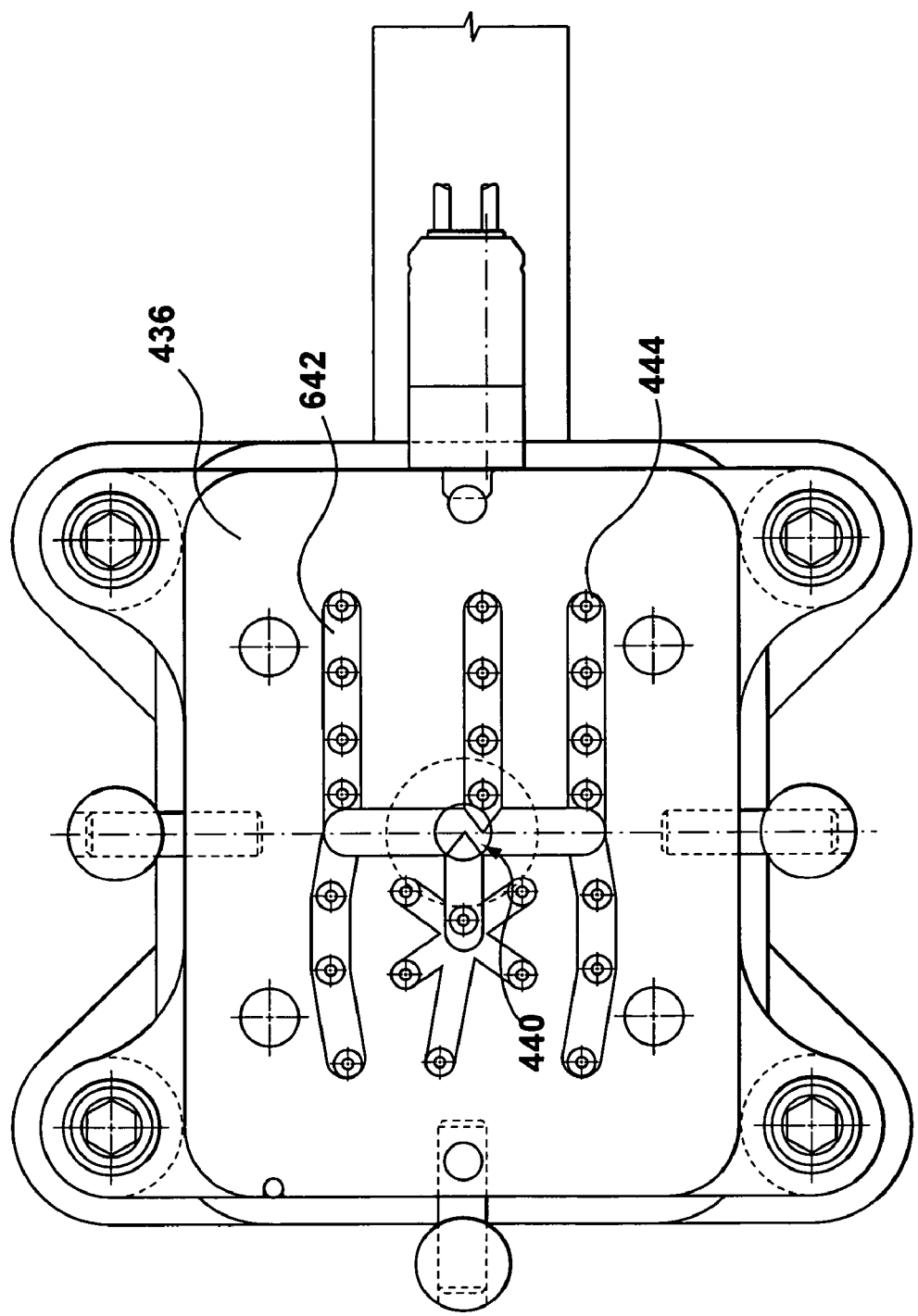
FIG. 6 is another top planar view of the second sub-manifold plate of FIG. 5.

Further embodiments of a sub-manifold according to the present invention are shown in FIGS. 4-6. FIG. 4 is a top planar view of a first sub-manifold plate 434. Sub-manifold plate 434 includes a manifold inlet 440 that distributes melt via melt channels (not shown) to a plurality of manifold outlets 444 (shown in phantom). It shall appreciated that manifold outlets may be unevenly distributed throughout the sub-manifold.

A second sub-manifold plate 436 includes a heating element 546 and an electrical connector 545, as shown in FIG. 5. FIG. 5 is a top planar view of second sub-manifold plate 436 showing the orientation of heating element 546 (in phantom). As shown, heating element 546 may be distributed through sub-manifold plate 436 so that it extends between manifold outlets 444

FIG. 6 is another top planar view of the second sub-manifold plate 436 showing the orientation of melt channels 642. Melt channels 642 distribute melt to manifold outlets 444. Melt channels 642 may be nonlinear and/or unbalanced about manifold inlet 440. Such an arrangement may be used to accommodate the close spacing, i.e., small pitch, of the mold cavities which the sub-manifold feeds. It shall be understood that a nozzle is coupled to each of manifold outlets 444 to receive melt therefrom.

Many features and advantages of the invention are apparent from the detailed specification. It is intended by the claims to cover all such features and advantages that fall within the scope of the invention. Numerous modifications and changes will readily occur to those skilled in the art, it is not desired to limit the invention to the exact construction and operation illustrated and described. Accordingly, all suitable modifications and equivalents that may be resorted to are considered to fall within the scope of the invention.

The invention claimed is:

1. An injection molding apparatus comprising:
a main manifold having a manifold melt channel that includes a manifold inlet and a plurality of manifold outlets, wherein said manifold inlet is in fluid communication with a melt source;
a sub-manifold including a sub-manifold plate, a plurality of sub-manifold melt channels and a nozzle plate coupled to said sub-manifold plate, wherein said sub-manifold melt channels include a common inlet in fluid communication with a respective manifold outlet; and
a plurality of unheated nozzles, wherein each nozzle includes a nozzle melt channel that has a nozzle inlet, wherein said nozzle plate is configured to directly retain said nozzles such that said nozzle inlets are in fluid communication with respective sub-manifold melt channel outlets, and wherein said nozzle plate does not form part of a sub-manifold melt channel.

2. The injection molding apparatus of claim 1, further comprising a sub-manifold heater coupled to said sub-manifold plate.

3. The injection molding apparatus of claim 1, further comprising a nozzle plate heater coupled to said nozzle plate.

4. The injection molding apparatus of claim 1, wherein said sub-manifold includes a further sub-manifold plate, wherein said sub-manifold plate is coupled to an upstream surface of said further sub-manifold plate.

5. The injection molding apparatus according to claim 4, wherein at least one sub-manifold melt channel includes a first portion and a second portion and said first portion is located in said sub-manifold plate and said second portion is located in said further sub-manifold plate.

6. The injection molding apparatus according to claim 1, wherein at least one nozzle includes a shoulder portion located in a bore provided in said nozzle plate and abutting a step in said bore.

7. The injection molding apparatus according to claim 1, wherein the sub-manifold melt channel outlets are unevenly distributed with respect to the sub-manifold melt channel inlet.

8. The injection molding apparatus according to claim 1, wherein at least one sub-manifold melt channel has a non-linear path.

9. The injection molding apparatus according to claim 1, wherein at least one nozzle is brazed or press fit in said nozzle plate.

10. The injection molding apparatus according to claim 1, wherein said nozzles abut said sub-manifold plate.

11. The injection molding apparatus according to claim 1, wherein said nozzle plate is coupled to a single sub-manifold plate.

12. An injection molding apparatus comprising:
a main manifold having a manifold melt channel that includes a manifold inlet and a plurality of manifold outlets, wherein said manifold inlet is in fluid communication with a melt source;
a sub-manifold including a sub-manifold plate, a plurality of sub-manifold melt channels and a nozzle plate, wherein said sub-manifold melt channels include a common inlet in fluid communication with a respective manifold outlet, and the nozzle plate includes a plurality of nozzle bores; and
a plurality of nozzles each received within a respective one of the nozzle bores of the nozzle plate, wherein each nozzle includes a nozzle melt channel that has a nozzle inlet,
wherein the nozzle plates are each configured to retain said nozzles such that said nozzle inlets are in fluid communication with respective sub-manifold melt channel outlets, and wherein an upstream portion of each nozzle abuts said sub-manifold plate.

13. The injection molding apparatus of claim 12, further comprising a sub-manifold heater coupled to said sub-manifold plate.

14. The injection molding apparatus of claim 12, further comprising a nozzle plate heater coupled to said nozzle plate.

15. The injection molding apparatus of claim 12, wherein said sub-manifold includes a further sub-manifold plate, wherein said sub-manifold plate is coupled to an upstream surface of said further sub-manifold plate.

16. The injection molding apparatus according to claim 12, wherein the sub-manifold melt channel outlets are unevenly distributed with respect to the sub-manifold melt channel inlet.

17. An injection molding apparatus comprising:
a main manifold having a manifold melt channel that includes a manifold inlet and a plurality of manifold outlets, wherein said manifold inlet is in fluid communication with a melt source;
a sub-manifold including a sub-manifold plate, a plurality of sub-manifold melt channels and a nozzle plate coupled to said sub-manifold plate, wherein said sub-manifold melt channels include a common inlet in fluid communication with a manifold outlet; and
a plurality of nozzles, wherein each nozzle includes a nozzle melt channel that has a nozzle inlet;
wherein said nozzle plate is configured to directly retain said nozzles such that said nozzle inlets are in fluid communication with respective sub-manifold melt channel outlets, and wherein said nozzles are distributed about said nozzle plate unevenly with respect to said common inlet of said sub-manifold melt channels, and wherein said nozzle plate does not form part of a sub-manifold melt channel.

18. The injection molding apparatus of claim 17, further comprising a sub-manifold heater coupled to said sub-manifold plate.

19. The injection molding apparatus of claim 17, further comprising a nozzle plate heater coupled to said nozzle plate.

20. The injection molding apparatus of claim 17, wherein said sub-manifold plate includes a first sub-manifold plate and a second sub-manifold plate, wherein said first sub-manifold plate is coupled to an upstream surface of said second sub-manifold plate.

21. The injection molding apparatus according to claim 15, wherein at least one sub-manifold melt channel includes a first portion and a second portion and said first portion is located in said sub-manifold plate and said second portion is located in said further sub-manifold plate.

22. The injection molding apparatus according to claim 12, wherein at least one nozzle includes a shoulder portion located in a bore provided in said nozzle plate and abutting a step in said bore.

* * * * *